United States Patent
Dobrica et al.

(10) Patent No.: US 12,281,706 B2
(45) Date of Patent: Apr. 22, 2025

(54) FLOATING RING SEAL FOR REFRIGERANT COMPRESSOR

(71) Applicant: DANFOSS A/S, Nordborg (DK)

(72) Inventors: Mihai B. Dobrica, Albigny-sur-Saone (FR); Tianlei Li, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 119 days.

(21) Appl. No.: 17/791,575

(22) PCT Filed: Dec. 9, 2020

(86) PCT No.: PCT/US2020/063994
§ 371 (c)(1),
(2) Date: Jul. 8, 2022

(87) PCT Pub. No.: WO2021/230909
PCT Pub. Date: Nov. 18, 2021

(65) Prior Publication Data
US 2022/0381350 A1    Dec. 1, 2022

Related U.S. Application Data

(60) Provisional application No. 63/022,629, filed on May 11, 2020.

(51) Int. Cl.
*F16J 15/44* (2006.01)
*F25B 31/00* (2006.01)

(52) U.S. Cl.
CPC ............. *F16J 15/441* (2013.01); *F25B 31/00* (2013.01)

(58) Field of Classification Search
CPC ................................. F25B 31/00; F16J 15/441
See application file for complete search history.

(56) References Cited

U.S. PATENT DOCUMENTS

| | | | | |
|---|---|---|---|---|
| 1,326,064 A | * | 12/1919 | Keller | F16J 15/441 |
| | | | | 277/544 |
| 2,912,265 A | * | 11/1959 | Brummer | F16J 15/36 |
| | | | | 277/363 |
| 3,655,205 A | * | 4/1972 | Petersen | F04D 29/128 |
| | | | | 277/910 |
| 4,289,264 A | * | 9/1981 | Rawlins | F16K 11/0712 |
| | | | | 277/447 |

(Continued)

FOREIGN PATENT DOCUMENTS

| | | |
|---|---|---|
| CN | 106122482 A | 11/2016 |
| DE | 1937418 A1 | 2/1971 |

OTHER PUBLICATIONS

International Search Report and Written Opinion for PCT/US2020/063994 dated Mar. 3, 2021.

*Primary Examiner* — Eugene G Byrd
(74) *Attorney, Agent, or Firm* — Carlson, Gaskey & Olds, P.C.

(57) ABSTRACT

A refrigerant compressor according to an exemplary aspect of the present disclosure includes, among other things, a floating ring seal having a nose configured to contact a housing. Further, a low friction coating including carbon nanotubes (CNTs) is applied to one or both of the nose and the housing. In another aspect of this disclosure, the floating ring seal has first and second noses configured to contact the housing, and the first nose is radially spaced-apart from the second nose.

16 Claims, 3 Drawing Sheets

(56) References Cited

U.S. PATENT DOCUMENTS

| | | | | |
|---|---|---|---|---|
| 4,489,951 A | * | 12/1984 | Kataoka | F16J 15/3468 |
| | | | | 277/362 |
| 4,504,069 A | * | 3/1985 | Stenlund | F16J 15/441 |
| | | | | 277/422 |
| 4,552,368 A | * | 11/1985 | Wallace | F16J 15/164 |
| | | | | 277/390 |
| 4,641,842 A | | 2/1987 | Kataoka | |
| 5,299,813 A | | 4/1994 | McKenna | |
| 5,322,298 A | * | 6/1994 | Maier | F16J 15/441 |
| | | | | 277/430 |
| 5,518,256 A | | 5/1996 | Gaffal | |
| 5,640,854 A | * | 6/1997 | Fogt | F25B 31/008 |
| | | | | 62/505 |
| 5,695,199 A | * | 12/1997 | Rao | F16J 9/20 |
| | | | | 277/455 |
| 6,082,964 A | * | 7/2000 | Kuroiwa | F04D 29/167 |
| | | | | 415/113 |
| 10,378,540 B2 | * | 8/2019 | Stover | F04C 18/0215 |
| 2004/0094901 A1 | * | 5/2004 | Gittler | F16J 15/441 |
| | | | | 277/408 |
| 2007/0163655 A1 | * | 7/2007 | Hunter | F16K 3/02 |
| | | | | 251/368 |
| 2014/0024563 A1 | | 1/2014 | Heidecker et al. | |
| 2014/0265145 A1 | * | 9/2014 | Copeland, III | F02C 7/28 |
| | | | | 277/358 |
| 2016/0040668 A1 | | 2/2016 | Fritts et al. | |
| 2019/0249559 A1 | * | 8/2019 | Sonokawa | F16J 15/002 |
| 2020/0063873 A1 | | 2/2020 | Tokunaga et al. | |

* cited by examiner

FLOATING RING SEAL FOR REFRIGERANT COMPRESSOR

PRIORITY CLAIM

This application claims the benefit of U.S. Provisional Application No. 63/022,629, filed on May 11, 2020.

BACKGROUND

Refrigerant compressors are used to circulate refrigerant in a chiller or heat pump via a refrigerant loop. Such compressors are known to include various seals at interfaces between the rotating and non-rotating parts of the compressor.

SUMMARY

A refrigerant compressor according to an exemplary aspect of the present disclosure includes, among other things, a floating ring seal having a nose configured to contact a housing. Further, a low friction coating including carbon nanotubes (CNTs) is applied to one or both of the nose and the housing.

In a further embodiment of the foregoing refrigerant compressor, a radial dimension of the nose is less than a radial dimension of the floating ring seal.

In a further embodiment of any of the foregoing refrigerant compressors, a radially inner surface of the nose is spaced-apart from a radially inner surface of the floating ring seal.

In a further embodiment of any of the foregoing refrigerant compressors, the compressor includes a shaft surrounded by the floating ring seal, and the radially inner surface of the floating ring seal is radially spaced-apart from a radially outer surface of the shaft.

In a further embodiment of any of the foregoing refrigerant compressors, the refrigerant compressor includes a motor and an impeller connected via the shaft.

In a further embodiment of any of the foregoing refrigerant compressors, an oil is applied on the CNTs.

In a further embodiment of any of the foregoing refrigerant compressors, the nose is a first nose, the floating ring seal includes a second nose configured to contact the housing, and the second nose is radially spaced-apart from the first nose.

In a further embodiment of any of the foregoing refrigerant compressors, the first nose is radially inward of the second nose, a radially inner surface of the first nose is spaced-apart from a radially inner surface of the floating ring seal, and a radially outer surface of the second nose is radially aligned with a radially outer surface of the floating ring seal.

In a further embodiment of any of the foregoing refrigerant compressors, the first nose exhibits a different radial dimension than the second nose.

In a further embodiment of any of the foregoing refrigerant compressors, the first nose is radially inward of the second nose, and the second nose exhibits a greater radial dimension than the first nose.

In a further embodiment of any of the foregoing refrigerant compressors, the floating ring seal includes a main body portion, and the main body portion extends radially between radially inner and outer surfaces and extends axially between first and second axial surfaces.

In a further embodiment of any of the foregoing refrigerant compressors, axial surfaces of the first and second noses are spaced-apart from the second axial surface of the main body portion by an equal distance.

In a further embodiment of any of the foregoing refrigerant compressors, the main body portion includes an internal passageway including a first opening in the first axial surface and a second opening in the second axial surface, and the second opening is radially between the first and second noses.

In a further embodiment of any of the foregoing refrigerant compressors, the internal passageway is one of a plurality of internal passageways of the main body portion.

In a further embodiment of any of the foregoing refrigerant compressors, the refrigerant compressor is used in a heating, ventilation, and air conditioning (HVAC) chiller system.

A refrigerant compressor according to an exemplary aspect of the present disclosure includes, among other things, a floating ring seal having a first nose configured to contact a housing and a second nose configured to contact the housing. Further, the first nose is radially spaced-apart from the second nose.

In a further embodiment of the foregoing refrigerant compressor, at least one passageway is formed in the floating ring seal, and the at least one passageway fluidly connects a radial space between the first nose and the second nose to a high pressure location.

In a further embodiment of any of the foregoing refrigerant compressors, the at least one passageway includes a plurality of passageways.

In a further embodiment of any of the foregoing refrigerant compressors, a low friction coating including carbon nanotubes (CNTs) is applied to either or both of (1) the first nose and the second nose and (2) the housing.

In a further embodiment of any of the foregoing refrigerant compressors, the first nose is radially inward of the second nose, the first nose exhibits a lesser radial dimension than the second nose, a radially inner surface of the first nose is spaced-apart from a radially inner surface of the floating ring seal, and a radially outer surface of the second nose is radially aligned with a radially outer surface of the floating ring seal.

DETAILED DESCRIPTION

Figure 1:
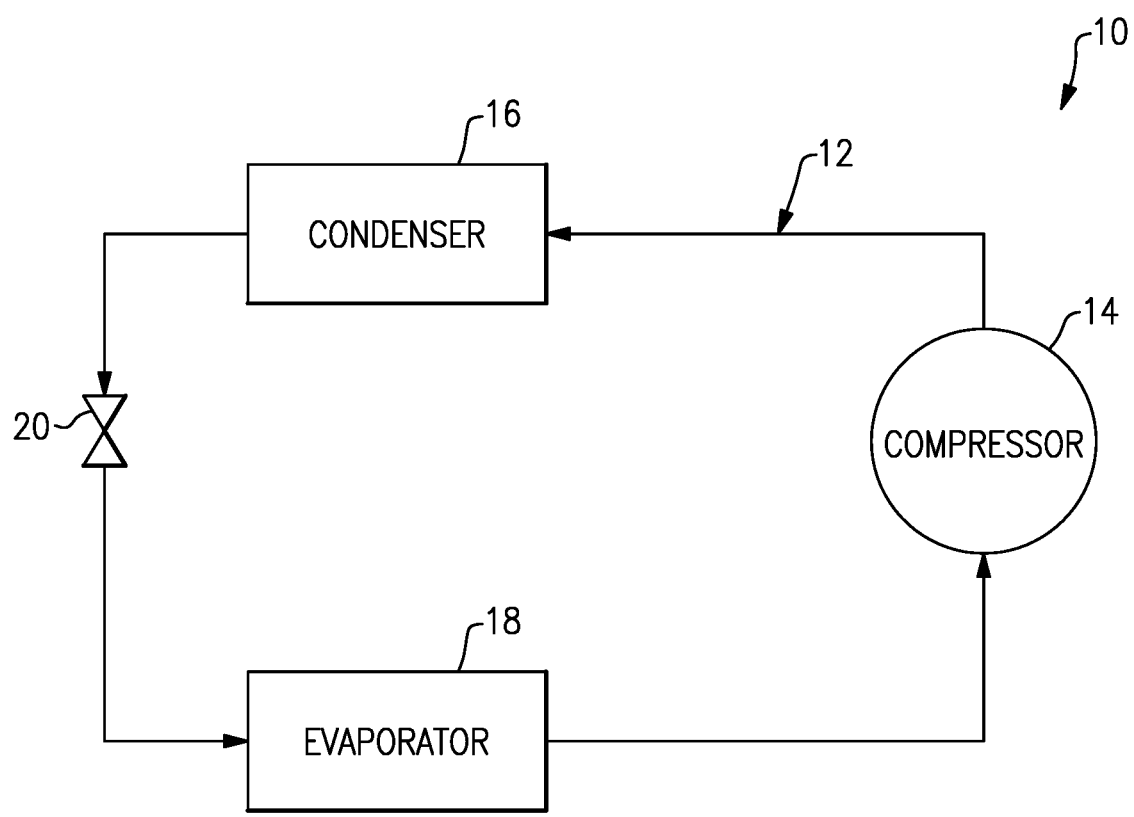
FIG. 1 schematically illustrates an example refrigerant loop.

FIG. 1 schematically illustrates a refrigerant system 10. The refrigerant system 10 includes a main refrigerant loop, or circuit, 12 in communication with a compressor or multiple compressors 14, a condenser 16, an evaporator 18, and an expansion device 20. This refrigerant system 10 may be used in a chiller or heat pump, for example. While a particular example of the refrigerant system 10 is shown, this disclosure extends to other refrigerant system configurations. For instance, the main refrigerant loop 12 can include an economizer downstream of the condenser 16 and upstream of the expansion device 20. The refrigerant cooling system 10 may be an air conditioning system, for example.

Figure 2:
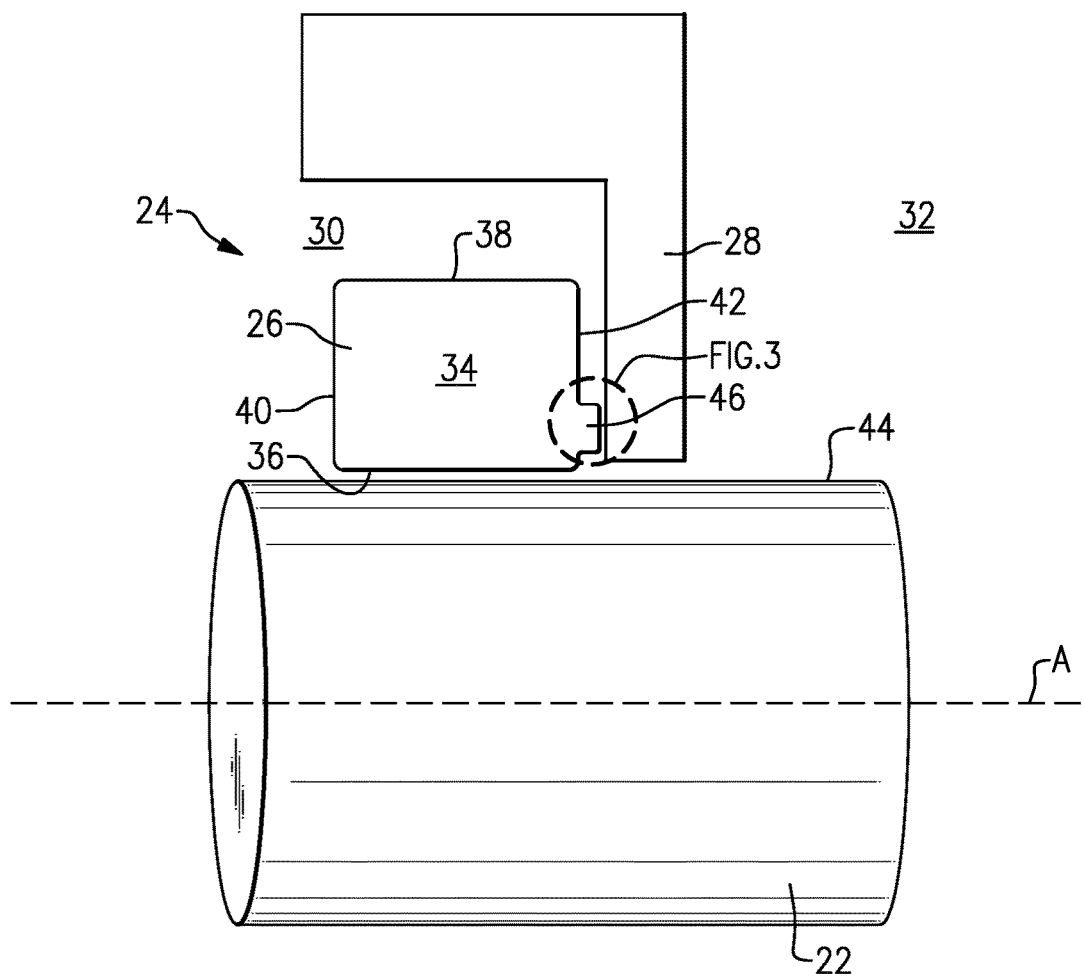
FIG. 2 schematically illustrates a shaft relative to a sealing assembly.

The compressor 14, in this example, is a centrifugal compressor and thus includes at least one impeller rotationally driven by a motor which is connected to the impeller via a shaft 22 (FIG. 2). The motor is configured to rotate the shaft 22, and in turn the impeller, about an axis A. This disclosure is not limited to centrifugal compressors, and the compressor 14 may be another type of compressor in other examples.

A portion of the shaft 22 is illustrated relative to a sealing assembly 24 in FIG. 2. The sealing assembly 24 includes a floating ring seal 26 and a housing 28. The sealing assembly 24 may be arranged at one of a number of locations within the compressor 14 to limit leakage of fluid, such as coolant, refrigerant, or lubricant, between two adjacent sections of the compressor 14. The sealing assembly 24 may be used relative to other rotating elements of the compressor 14, and in this regard the shaft 22 is representative of any rotating element.

In FIG. 2, the sealing assembly 24 is configured to limit leakage of fluid between a high pressure location 30 and a low pressure location 32 on opposite axial sides of the housing 28. Due to pressure differences, an axial side of the floating ring seal 26 presses against the housing 28 to establish a seal.

The floating ring seal 26 is a hoop and extends about the entire circumference of the shaft 22. Only a portion of the cross-section of the floating ring seal 26 is shown in FIG. 2. The floating ring seal 26 includes a main body portion 34 extending radially between a radially inner surface 36 and a radially outer surface 38, and axially between a first axial surface 40 and a second axial surface 42. The radially inner surface 36 is spaced-apart radially from an outer surface 44 of the shaft 22. Vibrations of the shaft 22 during operation, however, may cause the shaft 22 to move radially by distances which exceed the radial clearance between the outer surface 44 and the radially inner surface 36. In this case, by hydrodynamic effect, the floating ring seal 26 is pushed in the direction of shaft movement before actual contact occurs between the outer surface 44 and the inner surface 36. The pressure difference across the floating ring seal 26 pushes the floating ring seal 26 against the housing 28 leading to contact pressure between the floating ring seal 26 and the housing 28. Ideally, if friction between the floating ring seal 26 and the housing 28 is sufficiently small, the seal 26 should follow the radial movement (e.g., vibration) of the shaft 22 without contacting the outer surface 44 during operation.

Figure 3:
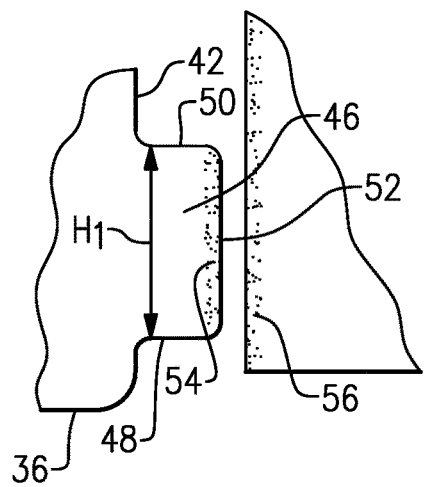
FIG. 3 is a close-up view of the encircled area in FIG. 2.

In order to reduce friction between the floating ring seal 26 and the housing 28, the floating ring seal 26 includes a nose 46 projecting axially from the second axial surface 42 toward the housing 28. With reference to FIG. 3, the nose 46 includes a radially inner surface 48, a radially outer surface 50 spaced-apart radially from the radially inner surface 48 by a height $H_1$, and an axial surface 52 parallel to and axially spaced-apart from the second axial surface 42. The height $H_1$ is substantially less than the distance between the radially inner and outer surfaces 36, 38. The pressure around the floating ring seal 26 is then balanced in spaces outward of the radially outer surface 50. Further, in this example, the radially inner surface 48 is spaced-apart from the radially inner surface 36. The arrangement of the nose 46 reduces the friction between the floating ring seal 26 and the housing 28 while still establishing an effective seal.

In order to further reduce friction between the floating ring seal 26 and the housing 28, in this disclosure at least one of the nose 46 and the housing 28 includes a low friction coating. In FIG. 3, both the nose 46 and the housing 28 include respective low friction coatings 54, 56. The low friction coatings 54, 56 may be provided by carbon nanotubes (CNTs) deposited on either the nose 46 or the housing 28. Further, oils can also be applied on the CNTs. Other types of low friction coatings such as Teflon™ and diamond-like carbon can be applied.

Figure 4:
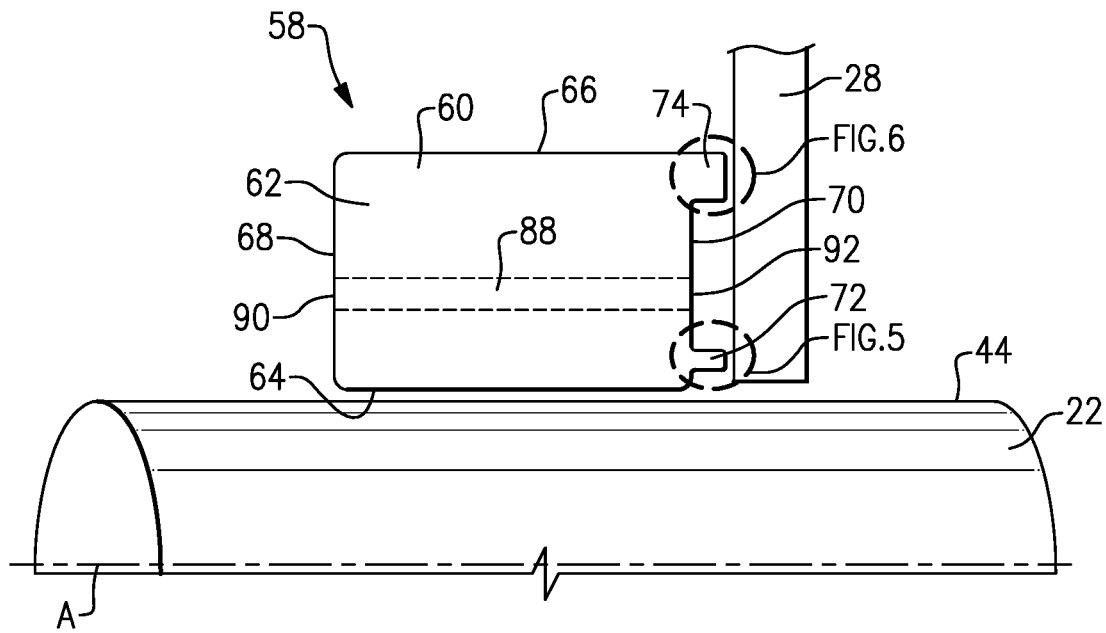
FIG. 4 schematically illustrates a shaft relative to another sealing assembly.

FIG. 4 illustrates another example sealing assembly 58 with another floating ring seal 60 arranged relative to the shaft 22 and housing 28. As above, the floating ring seal 60 is a hoop and extends about the entire circumference of the shaft 22, despite only a portion of the floating ring seal 60 being shown in FIG. 4. The floating ring seal 60 includes a main body portion 62 extending radially between a radially inner surface 64 and a radially outer surface 66, and axially between a first axial surface 68 and a second axial surface 70. The radially inner surface 64 is spaced-apart radially from the outer surface 44 of the shaft 22, as in FIG. 2.

The floating ring seal 60 includes a first nose 72 and a second nose 74 projecting axially from the second axial surface 70 toward the housing 28. The first and second noses 72, 74 are radially spaced-apart from one another.

Figure 5:
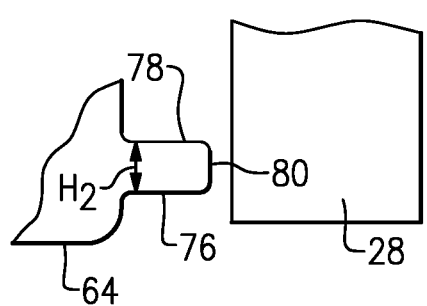
FIG. 5 is a close-up view of the encircled area in FIG. 4.
Figure 6:
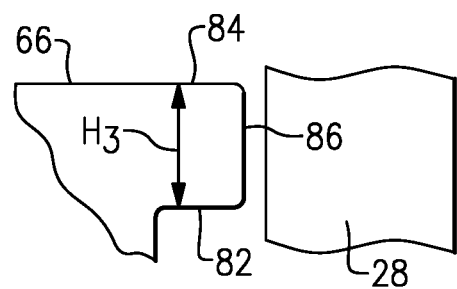
FIG. 6 is a close-up view of the encircled area in FIG. 4.

The first nose 72 is illustrated in more detail in FIG. 5. The first nose 72 includes a radially inner surface 76, a radially outer surface 78 spaced-apart radially from the radially inner surface 76 by a height $H_2$, and an axial surface 80 parallel to and axially spaced-apart from the second axial surface 70. The height $H_2$ is less than the height $H_1$. In this example, the radially inner surface 76 is spaced-apart from the radially inner surface 64.

The second nose 74 includes a radially inner surface 82, a radially outer surface 84 spaced-apart radially from the radially inner surface 82 by a height $H_3$, and an axial surface 86 parallel to and spaced-apart from the second axial surface 70. The axial surfaces 80, 86 are spaced-apart from the second axial surface 70 by an equal distance. Further, in this example, the radially outer surface 84 is radially aligned with the radially outer surface 66. In other examples, the radially outer surface 84 could be spaced-apart radially inward of the radially outer surface 66. The height $H_3$, in this example, is greater than the height $H_2$.

The floating ring seal 60 includes a plurality of internal passageways 88, one of which is shown in FIG. 4. The internal passageway 88 includes a first opening 90 in the first axial surface 68 radially between the first and second noses 72, 74, and a second opening 92 in the second axial surface 70 radially between the first and second noses 72, 74. The internal passageway 88 provides high pressure fluid adjacent the radially outer side of the first nose 72.

The arrangement of the floating ring seal 60 is such that it reduces the section of the floating ring seal 60 exposed to a pressure drop. This leads to a reduced axial force on the floating ring seal 60, which, in turn, leads to a reduction of the friction force opposing the free floating nature of the floating ring seal 60. This prevents the floating ring seal 60 from "locking" (i.e., sticking) in place under high pressure drops (i.e., when the high pressure at location 30 is substantially larger than the low pressure at location 32).

The floating ring seal 60, namely the first and/or second nose 72, 74, and/or the housing 28 of FIG. 4 could also include a low friction coating, such as that described in the embodiment of FIGS. 2 and 3.

It should be understood that directional terms such as "radially," "axially," and "circumferentially" are used herein in accordance with their known meanings and with reference to the axis A. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant compressor, comprising:
    a floating ring seal having a nose configured to contact a housing, wherein a low friction coating including carbon nanotubes (CNTs) is applied to one or both of the nose and the housing, wherein a radial dimension of the nose is less than a radial dimension of the floating ring seal, wherein a radially inner surface of the nose is spaced-apart from a radially inner surface of the floating ring seal; and
    a shaft surrounded by the floating ring seal, and wherein the radially inner surface of the floating ring seal is radially spaced-apart from a radially outer surface of the shaft, wherein the refrigerant compressor includes a motor and an impeller connected via the shaft.

2. The refrigerant compressor as recited in claim 1, wherein an oil is applied on the CNTs.

3. The refrigerant compressor as recited in claim 1, wherein:
    the nose is a first nose,
    the floating ring seal includes a second nose configured to contact the housing, and
    the second nose is radially spaced-apart from the first nose.

4. The refrigerant compressor as recited in claim 3, wherein:
    the first nose is radially inward of the second nose,
    a radially inner surface of the first nose is spaced-apart from a radially inner surface of the floating ring seal, and
    a radially outer surface of the second nose is radially aligned with a radially outer surface of the floating ring seal.

5. The refrigerant compressor as recited in claim 3, wherein the first nose exhibits a different radial dimension than the second nose.

6. The refrigerant compressor as recited in claim 5, wherein:
    the first nose is radially inward of the second nose, and
    the second nose exhibits a greater radial dimension than the first nose.

7. The refrigerant compressor as recited in claim 3, wherein:
    the floating ring seal includes a main body portion, and
    the main body portion extends radially between radially inner and outer surfaces and extends axially between first and second axial surfaces.

8. The refrigerant compressor as recited in claim 7, wherein axial surfaces of the first and second noses are spaced-apart from the second axial surface of the main body portion by an equal distance.

9. The refrigerant compressor as recited in claim 7, wherein:
    the main body portion includes an internal passageway including a first opening in the first axial surface and a second opening in the second axial surface, and
    the second opening is radially between the first and second noses.

10. The refrigerant compressor as recited in claim 9, wherein the internal passageway is one of a plurality of internal passageways of the main body portion.

11. A refrigerant compressor, comprising:
    a floating ring seal having a nose configured to contact a housing, wherein a low friction coating including carbon nanotubes (CNTs) is applied to one or both of the nose and the housing, and wherein the refrigerant compressor is used in a heating, ventilation, and air conditioning (HVAC) chiller system.

12. A refrigerant compressor, comprising:
    a floating ring seal having a first nose configured to contact a housing and a second nose configured to contact the housing, wherein the first nose is radially spaced-apart from the second nose, wherein the refrigerant compressor is used in a heating, ventilation, and air conditioning (HVAC) chiller system.

13. The refrigerant compressor as recited in claim 12, wherein at least one passageway is formed in the floating ring seal, and the at least one passageway fluidly connects a radial space between the first nose and the second nose to a high pressure location.

14. The refrigerant compressor as recited in claim 13, wherein the at least one passageway includes a plurality of passageways.

15. The refrigerant compressor as recited in claim 12, wherein a low friction coating including carbon nanotubes (CNTs) is applied to either or both of (1) the first nose and the second nose and (2) the housing.

16. The refrigerant compressor as recited in claim 12, wherein:
    the first nose is radially inward of the second nose,
    the first nose exhibits a lesser radial dimension than the second nose,
    a radially inner surface of the first nose is spaced-apart from a radially inner surface of the floating ring seal, and
    a radially outer surface of the second nose is radially aligned with a radially outer surface of the floating ring seal.

* * * * *